(12) United States Patent
Lee et al.

(10) Patent No.: US 11,824,173 B2
(45) Date of Patent: Nov. 21, 2023

(54) BATTERY MODULE

(71) Applicant: LG CHEM, LTD., Seoul (KR)

(72) Inventors: Young Kyu Lee, Daejeon (KR); Young Su Son, Daejeon (KR); Jae Young Jang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 872 days.

(21) Appl. No.: 16/676,153

(22) Filed: Nov. 6, 2019

(65) Prior Publication Data
US 2020/0144572 A1    May 7, 2020

(30) Foreign Application Priority Data
Nov. 7, 2018 (KR) .................. 10-2018-0136088

(51) Int. Cl.
| | | |
|---|---|---|
| *H01M 10/613* | (2014.01) | |
| *H01M 10/6554* | (2014.01) | |
| *H01M 10/6551* | (2014.01) | |
| *H01M 10/653* | (2014.01) | |
| *H01M 50/24* | (2021.01) | |
| *H01M 50/213* | (2021.01) | |
| *H01M 50/247* | (2021.01) | |
| *H01M 50/284* | (2021.01) | |

(52) U.S. Cl.
CPC ....... *H01M 10/613* (2015.04); *H01M 10/653* (2015.04); *H01M 10/6551* (2015.04); *H01M 10/6554* (2015.04); *H01M 50/213* (2021.01); *H01M 50/24* (2021.01); *H01M 50/247* (2021.01); *H01M 50/284* (2021.01)

(58) Field of Classification Search
CPC .. H01M 50/20; H01M 10/613; H01M 10/653; H01M 10/6551; H01M 10/6554; H01M 50/213
See application file for complete search history.

(56) References Cited

U.S. PATENT DOCUMENTS

| | | | |
|---|---|---|---|
| 2009/0068555 A1 | 3/2009 | Fukuoka et al. | |
| 2010/0266890 A1 | 10/2010 | Caumont et al. | |
| 2012/0031645 A1* | 2/2012 | Tartaglia | B23K 11/20 219/91.2 |
| 2014/0234686 A1* | 8/2014 | Sweney | H01M 50/519 429/120 |

FOREIGN PATENT DOCUMENTS

| | | | | |
|---|---|---|---|---|
| FR | 2915626 A1 | * | 10/2008 | ............... H01G 2/04 |
| FR | 3022402 A1 | * | 12/2015 | ............ B60L 3/0007 |
| JP | 07-220700 | * | 8/1995 | |
| JP | 3675954 B2 | | 7/2005 | |
| JP | 2009-295381 A | | 12/2009 | |

(Continued)

OTHER PUBLICATIONS

Machine translation of JP 07-220700, published on Aug. 18, 1995 (Year: 1995).*

*Primary Examiner* — Anca Eoff
(74) *Attorney, Agent, or Firm* — Birch, Stewart, Kolasch & Birch, LLP

(57) ABSTRACT

Discussed is a battery module, and more particularly, to a battery module in which an inner space between a battery cell and a metal plate is filled with a heat transfer member so that conduction of heat generated in the battery cell is improved.

15 Claims, 8 Drawing Sheets

(56) References Cited

FOREIGN PATENT DOCUMENTS

| | | |
|---|---|---|
| JP | 2012-119116 A | 6/2012 |
| JP | 5005183 B2 | 8/2012 |
| JP | 5379797 B2 | 12/2013 |
| JP | 6323878 B2 | 5/2018 |
| KR | 10-1287604 B1 | 7/2013 |
| KR | 10-2016-0131266 A | 11/2016 |
| WO | WO 2014/134142 A2 | 9/2014 |

* cited by examiner

FIG. 1    -- Prior Art --
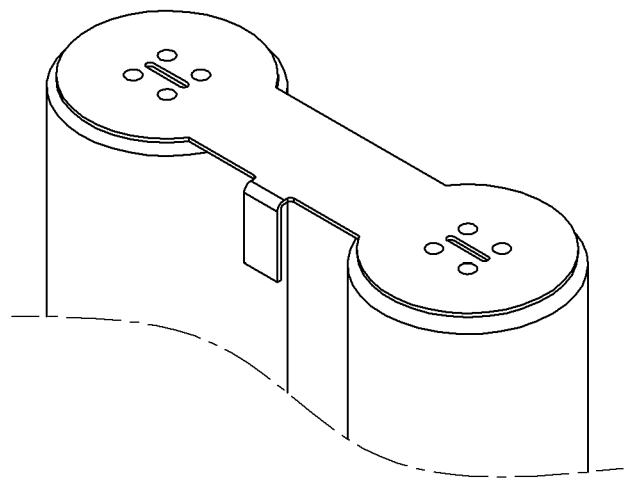
FIG. 2    -- Prior Art --
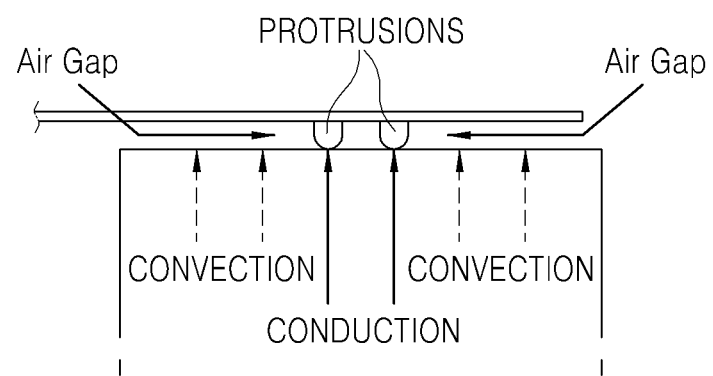

FIG. 12
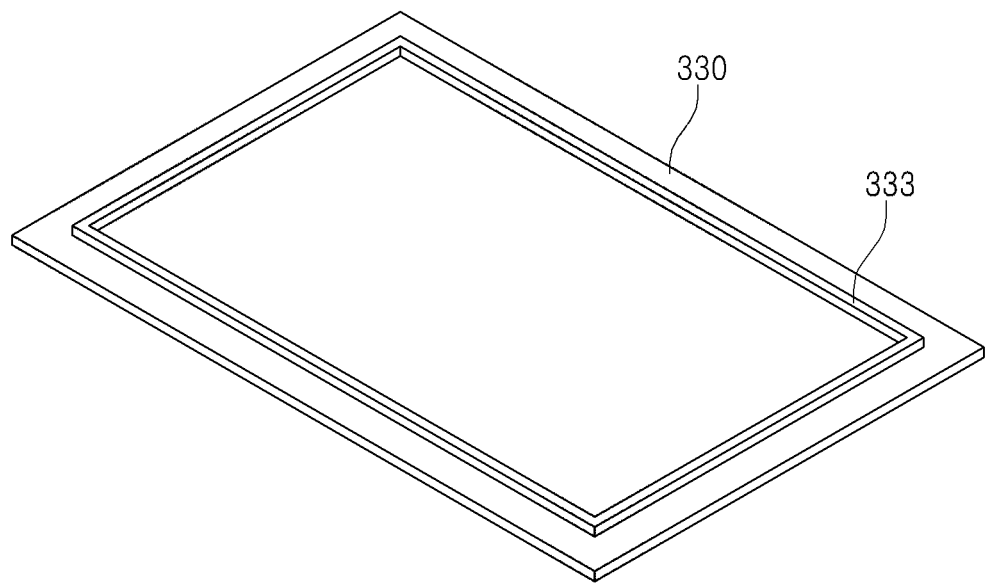
FIG. 13
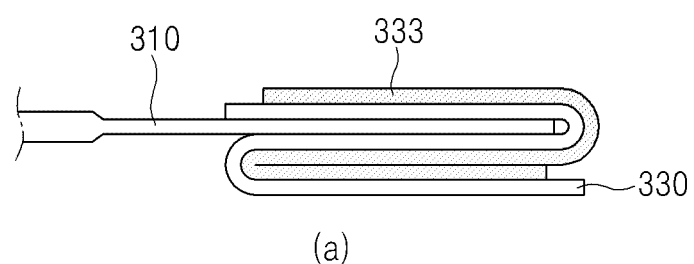
(a)
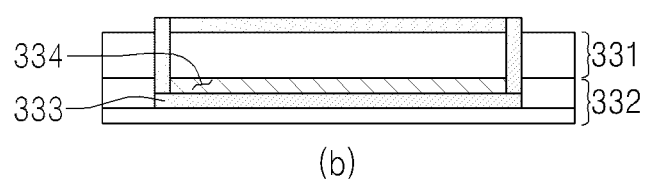
(b)

BATTERY MODULE

CROSS-REFERENCE TO RELATED APPLICATION

This application claims priority to Korean Patent Application No. 10-2018-0136088 filed on Nov. 7, 2018 and all the benefits accruing therefrom under 35 U.S.C. § 119, the entire content of which is incorporated herein by reference in its entirety.

BACKGROUND

The present disclosure relates to a battery module, and more particularly, to a battery module in which an inner space between a battery cell and a metal plate is filled with a heat transfer member so that conduction of heat generated in the battery cell is improved.

Lithium secondary batteries (hereinafter, referred to as battery cells), as a unit cell constituting a battery pack, have flexibility, relatively free shapes, light weight, and excellent safety, and thus have increasing demand as power sources for mobile electronic apparatuses, such as mobile phones, camcorders, and laptop computers.

In general, battery cells are divided into single cells (mobile phones, IT electronic apparatuses, etc.) or multi cells (electric tools, electric vehicles, ESS, e-transit, etc.) according to the number of battery cells, and divided into a cylindrical type, rectangular type, and a pouch type according to cell types.

The cylindrical battery cell and the rectangular cell are formed in a shape in which an electrode assembly is embedded in a cylindrical or rectangular metal can, and the pouch-type battery cell is formed in a shape in which an electrode assembly is embedded in a pouch-type case formed of an aluminum laminate sheet.

In general, when using a battery cell for a long time, heat is generated in the battery cell and much heat is generated during charge and discharge according to an amount of current. If the heat generated at this point is not sufficiently removed, the performance of the battery pack is degraded, and furthermore, fire or explosion may also be caused. Accordingly, a method for reducing heating of battery cells has emerged as a core problem.

FIG. 1 is a structural view of a conventional battery module.

Referring to FIG. 1, in a conventional battery module, electrode terminals of two battery cells are brought into contact with and electrically connected to a single flat metal plate. Such a connection form between the metal plate and the battery cells will be described in detail with reference to FIG. 2.

FIG. 2 is a side view of a metal plate and a battery cell of a conventional battery module.

Referring to FIG. 2, in general, a metal plate is connected to battery cells by spot welding and is formed with a plurality of protrusions. An air gap is formed in a free space by the protrusions between the metal plate and the battery cells, and heat is circulated by convection and stayed inside the air gap and thereby interrupts heat conduction and reduces cooling efficiency.

Accordingly, the air gap should be minimized or eliminated, but it is difficult to suppress generation of the air gap in a structural method according to the shapes of the protrusions. Therefore, an alternative is demanded to increase a heat conduction rate in a structure in which the air gap has been formed.

RELATED ART DOCUMENTS (Patent document 1) JP5005183 B

SUMMARY

The present disclosure provides a battery module in which the heat conduction rate of an air gap formed between a metal plate and a battery cell electrode terminals is improved.

In accordance with a first exemplary embodiment, a battery module includes: battery cells, a metal plate configured to contact and be electrically connected to respective electrode terminals of the battery cells and having a spot welding section provided with a plurality of protrusions contacting the respective electrode terminals; and a heat conductive member disposed in an inner space between the electrode terminals of the battery cells and the metal plate.

The metal plate may be provided with: a welding base part provided with the flat-shape spot welding section and having ductility for being movable downward so as to contact and be welded to the electrode terminals of the battery cells; a plate contact part formed in a shape bent and extending from an edge of the welding base part and contacting upper surfaces of the electrode terminals; and a heat conductive member injection opening perforated in a predetermined region of an upper surface of the welding base part so as to inject the heat conductive member therethrough, wherein the battery module may be configured to include a heat conductive member arrangement part which is a space formed inside the welding base part so as to be filled by the injected heat conductive member.

A liquid glue or a heat dissipation paste may be used for the heat conductive member and be cured after being injected into the heat conductive member arrangement part.

The metal plate may be joined to the respective electrodes of the battery cells by spot welding.

The battery cells may be provided in a single pair in which positive electrode terminals and negative electrode terminals are alternately arranged.

In accordance with a second exemplary embodiment, a battery module includes: battery cells, a metal plate configured to contact and be electrically connected to respective electrode terminals of the battery cells and including a spot welding section provided with a plurality of protrusions contacting the electrode terminals; and a heat conductive member disposed in inner spaces between the electrode terminals of the battery cells and the metal plate.

The metal plate may be provided with: an elevated part formed in a shape bent to an outside of a surface on which the metal plate and the electrode terminals of the battery cells are coupled; a welding base part provided with the flat-shape spot welding section and having ductility for being movable downward so as to contact and be welded to the electrode terminals of the battery cells; a plate contact part formed in a shape bent and extending from an edge of the elevated part and contacting an upper surface of each of the electrode terminals; and a heat conductive member injection opening perforated in predetermined regions of an upper end of the elevated part so as to inject the heat conductive member therethrough, wherein the battery module may be configured to include a heat conductive member arrangement part which is a space formed inside the elevated part and the welding base part so as to be filled by the injected heat conductive member.

The elevated part may be formed in a height of approximately 1.5 to 3 times the thickness of the metal plates, and favorably, in a height of approximately 1 to 2 inclusive times.

A liquid glue or a heat dissipation paste may be used for the heat conductive members and be cured after being injected into the heat conductive member arrangement part.

The metal plate may be joined to the respective electrodes of the battery cells by spot welding.

The battery cells may be provided in a single pair in which positive electrode terminals and negative electrode terminals are alternately arranged.

In accordance with a third exemplary embodiment, a battery module includes: battery cells; a printed circuit board provided with a circuit for controlling the battery cells; a metal plate which is provided with a first bent part formed to be bent so as to contact and be electrically connected to an upper/lower surface of an electrode terminal of each of the battery cells, and a second bent part including a plurality of protrusions formed under the first bent part and formed to be bent so as to be electrically connected to the printed circuit board; and a heat conductive member disposed in an inner space of the second bent part so as to fill an inside of the second bent part.

The metal plate may be provided with: an elevated part which is formed to be bent to an outside of a surface opposite to a surface contacting the electrode terminal of each of the battery cells and forms a partition wall on a pair of surfaces contacting and facing each other in the second bent part; and a heat conductive member injection opening provided in a predetermined region in which the elevated part is not formed so that the heat conductive member is disposed in the second bent part, wherein the battery module may be configured to include a heat conductive member arrangement part which is a space for disposing the heat conductive member inside the elevated part.

A liquid glue or a heat dissipation paste may be used for the heat conductive members and is cured after being injected into a mounting part.

The metal plate may be joined to the electrode terminal of each the battery cells by spot welding.

The battery pack may be used as a power source for a device.

BRIEF DESCRIPTION OF THE DRAWINGS

Exemplary embodiments can be understood in more detail from the following description taken in conjunction with the accompanying drawings, in which:

FIG. 1 is a structural view of a conventional battery module;

FIG. 2 is a side view of a metal plate and a battery cell of a conventional battery module;

FIG. 12 is a structural view of a metal plate and a battery cell in accordance with the third exemplary embodiment;

(a) of FIG. 13 is a side view of a metal plate coupled to a battery cell in accordance with the third exemplary embodiment; and (b) of FIG. 13 is a front view of the metal plate coupled to the battery cell in accordance with the third exemplary embodiment.

DETAILED DESCRIPTION OF EMBODIMENTS

Hereinafter with reference to the features disclosed in the accompanying drawings, exemplary embodiments will be described in detail. However, the present disclosure is not restricted or limited by the exemplary embodiments. Rather, these embodiments are provided so that this disclosure will be thorough and complete, and will fully convey the scope of the inventive concept to those skilled in the art.

Although the terms such as "first" and "second" are used herein to describe various elements, these elements should not be limited by these terms. The terms are only used to distinguish one component from other components. For example, without departing from the scope of the present invention, a first component may be referred to as a second component, and similarly, the second component may also be referred to as the first component. In the following description, the technical terms are used only for explaining a specific exemplary embodiment while not limiting the present disclosure. The terms of a singular form may include plural forms unless obviously referred to the contrary in context.

Terms used in the present invention is selected as general terms as widely used as possible while considering functions in the present invention, but these may be changed according to intent of a person skilled in the art, a precedent, an advent of new technique, or the like. In addition, in a specific case, there are terms arbitrarily selected by applicants, and in this case, the meaning of the terms will be described in detail in the corresponding description part of the present invention. Accordingly, the terms used in the present invention should be defined on the basis of the meanings the terms have and the contents of the entirety of the present invention rather than defined by simple names of the terms.

Embodiment 1

Hereinafter, a battery module in accordance with a first exemplary embodiment will be described.

In a battery module in accordance with a first exemplary embodiment, a heat conductive member is filled in an air gap, which is formed between electrode terminals of cylindrical battery cells and a metal plate and degrades heat discharge efficiency of the battery cells, so that the heat discharge efficiency can be enhanced.

Figure 3:
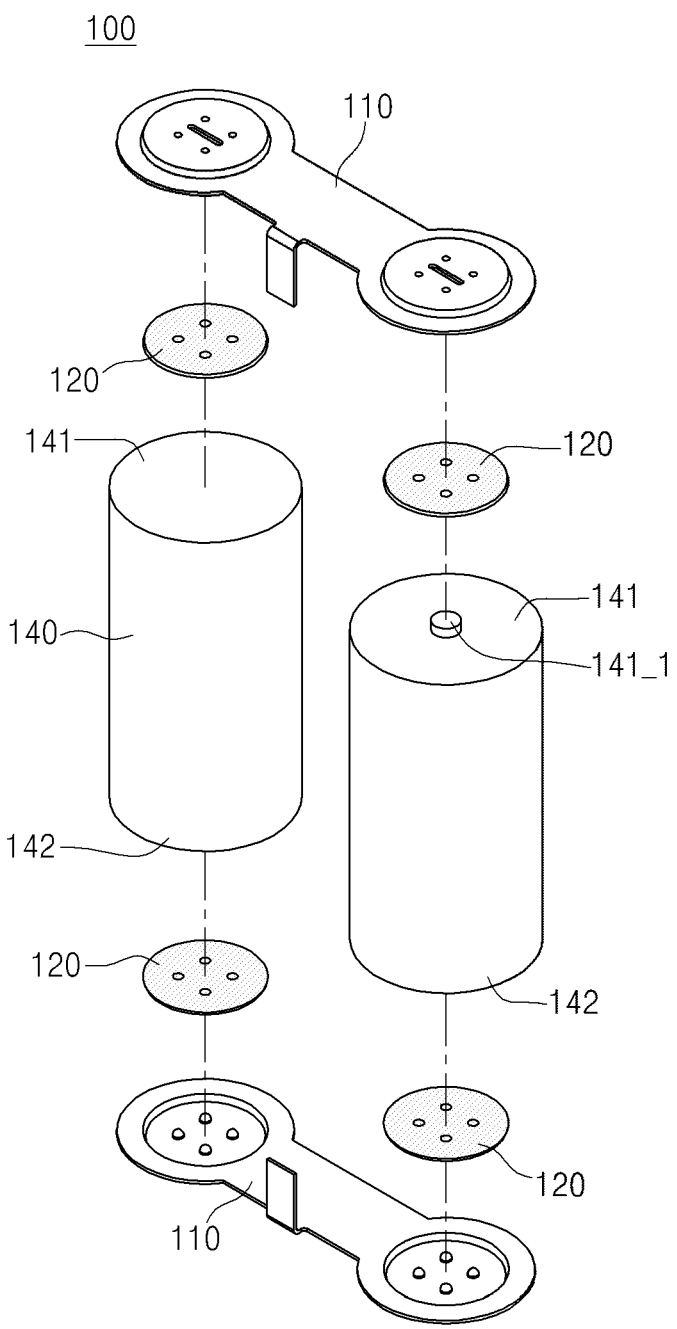
FIG. 3 is an exploded structural view of a battery module in accordance with a first exemplary embodiment.

FIG. 3 is an exploded structural view of a battery module in accordance with a first exemplary embodiment.

Figure 6:
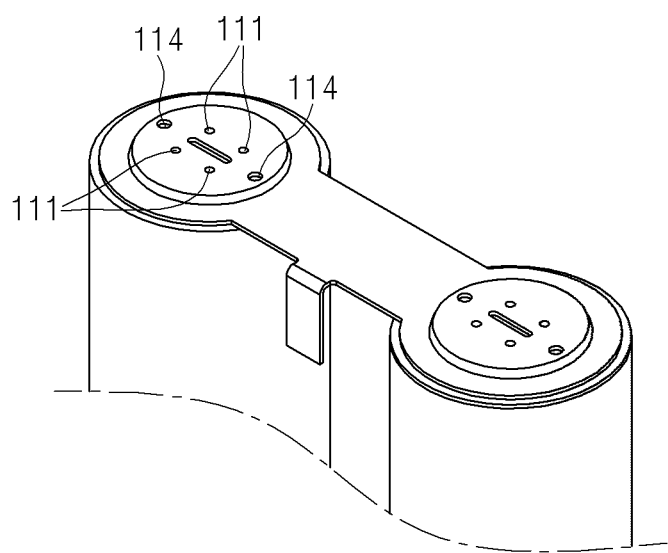
FIG. 6 is a perspective view of a battery module in accordance with the first exemplary embodiment.

FIG. 6 is a perspective view of the battery module in accordance with the first exemplary embodiment.

Referring to FIGS. 3 and 6, a battery module 100 in accordance with the first exemplary embodiment includes: battery cells 140, a metal plate 110 which contacts and is electrically connected to respective electrode terminals of the battery cells 140 and which have respective spot welding sections each provided with a plurality of protrusions contacting the respective electrode terminals; and heat conductive members 120 injected into inner spaces between the respective electrode terminals of the battery cells and the metal plate 110. Each battery cell 140 may include a cap 141_1, and a first side 141 and a second side 142 that correspond to electrode terminals of the battery cells 140.

The metal plate 110 may be formed only on one-side surfaces of the battery cells or may also be formed on both-side surfaces of the battery cells.

A specific configuration of the battery module will be described below in more detail.

Firstly, the metal plate 110 will be described in detail with reference to FIG. 4.

Figure 4:
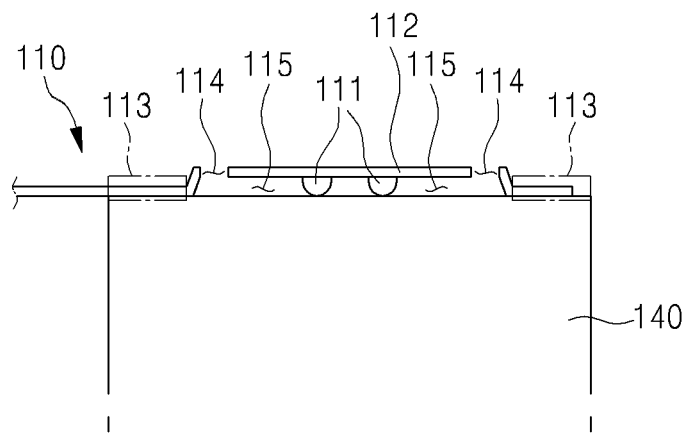
FIG. 4 is a side view of a metal plate and a battery cell in accordance with the first exemplary embodiment.

FIG. 4 is a side view of a metal plate and a battery cell in accordance with a first exemplary embodiment.

Referring to FIG. 4, the metal plate 110 is a component which contacts and is electrically connected to the electrode terminals of the battery cells 140, and which has a spot welding section in which a plurality of protrusions 111 contacting the electrode terminals are formed for electrical connection.

The protrusions 111 are created by spot welding performed for electrical connection between the electrode terminals of the battery cells and the metal plate. In addition, the protrusions 111 may also be protruding portions on the reverse side of a guide groove which is formed at the same position over the protrusions 111 for convenience of spot welding.

In addition, the metal plate 110 is provided with: a welding base part 112 which has the flat-shape spot welding section and has ductility for being movable downward so as to contact and be welded to the electrode terminals of the battery cells; a plate contact part 113 which is formed in a shape bent and extending from an edge of the welding base part so as to contact upper surfaces of the electrode terminals; and heat conductive member injection openings 114 created by perforating predetermined regions of an upper surface of the welding base part so as to inject the heat conductive member.

In addition, the metal plate 110 includes a heat conductive member arrangement part 115 which is a space formed inside the welding base part so as to be filled with the injected heat conductive member.

More specifically, the welding base part 112 is a component provided with the flat-shape spot welding section and having ductility for being movable downward so as to contact and be welded to the electrode terminals of the battery cells. Accordingly, the spot welding between the electrode terminals of the battery cells and the metal plate is performed on the spot welding section of the metal plate, the spot welding section is melted to form the protrusions 111 on the lower surface of the spot welding section, and the metal plate is electrically connected to the battery cells via the protrusions 111.

The plate contact part 113 is a component formed in a shape bent and extending from the edge of the welding base part and contacting the upper surfaces of the electrode terminals, and prevents the heat conductive member 120 disposed inside the heat conductive member arrangement part 115 from being discharged to the outside.

In addition, the heat conductive member injection openings 114, which are created by perforating the predetermined regions of the welding base part so as to fill the heat conductive member therethrough, allow the heat conductive member 220 to be easily filled therethrough.

In addition, the heat conductive member arrangement part 115, which is a space formed inside the welding base part so as to be filled with the injected heat conductive member, is formed in a shape in which the entire space of the heat conductive member arrangement part 115 excluding the protrusions 111 is filled when the heat conductive member 120 is injected.

In addition, the heat conductive member 120 is a component disposed in the inner space between the electrode terminals of the battery cells 140 and the metal plate 110, and will be described in detail with reference to FIG. 5.

Figure 5:
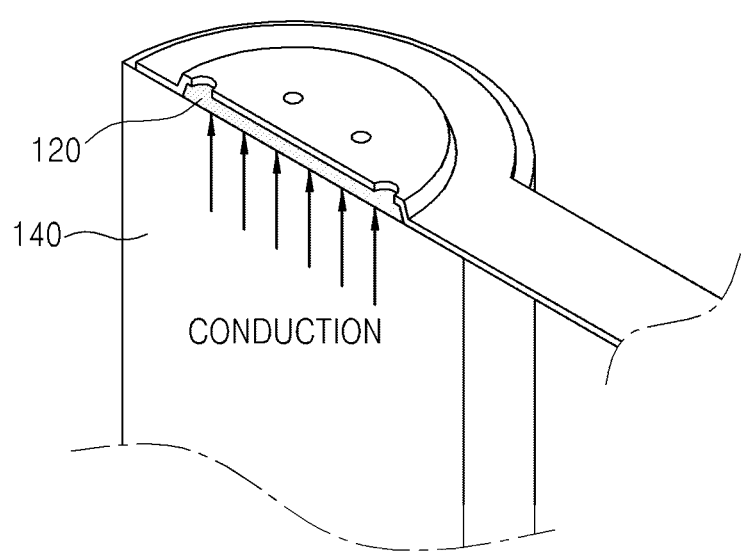
FIG. 5 is a cross-sectional perspective view of a battery module in which a heat conductive material is injected in accordance with the first exemplary embodiment.

FIG. 5 is a cross-sectional perspective view of a battery module in which a heat conductive member is injected in accordance with the first exemplary embodiment.

Referring to FIG. 5, the heat conductive member 120 is provided in the heat conductive member arrangement part 115 excluding the protrusions 111, and the heat conductive member 120 transfers heat generated in the battery cells to the metal plate 110 and allows heat, which was circulated by convection and not dissipated in an air gap according to related arts, to be quickly discharged to the outside.

For the heat conductive member 120, a liquid glue or a heat dissipation paste having high heat conductivity may be used. Such a liquid glue or a heat dissipation paste has adhesiveness and may be uniformly distributed inside the heat conductive member arrangement part 115. In addition, the heat conductive member has a characteristic of assuming an adhesive liquid phase shape before being injected into the heat conductive member arrangement part 115, but being cured when a predetermined time elapses after being injected.

In addition, the battery cells 140 are configured to be cylindrical cells as a single pair in which positive electrode terminals and the negative electrode terminals are alternately arranged, but may be arranged as a single pair in which the same electrodes are arranged in parallel.

In addition, since the battery module in accordance with the exemplary embodiment uses cylindrical battery cells, the welding base parts 112 and the plate contact parts 113 are formed in circular shapes.

Embodiment 2

Next, a battery module in accordance with a second exemplary embodiment will be described.

A battery module in accordance with the second exemplary embodiment further has an elevated part with a greater height than a welding base part so as to allow a heat conductive member to be easily filled in an air gap, because a problem may be caused in which when injecting a heat conductive member in the type of the battery module in accordance with the abovementioned first exemplary embodiment, the heat conductive member is not uniformly distributed up to the inside from the protrusions due to the adhesiveness of the heat conductive member, and thus a proper amount of glue is not injected and the glue leaks to the outside when injected.

Figure 7:
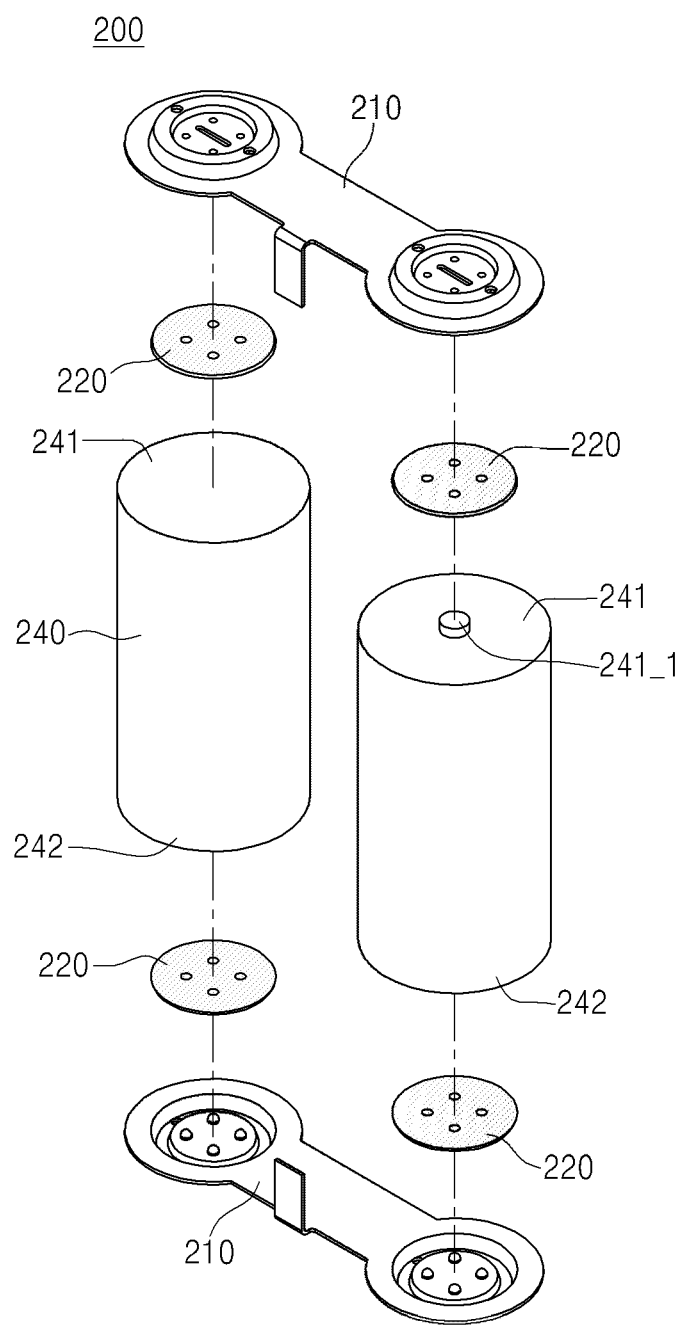
FIG. 7 is an exploded structural view of a battery module in accordance with a second exemplary embodiment.

FIG. 7 is an exploded structural view of a battery module in accordance with the second exemplary embodiment.

Figure 10:
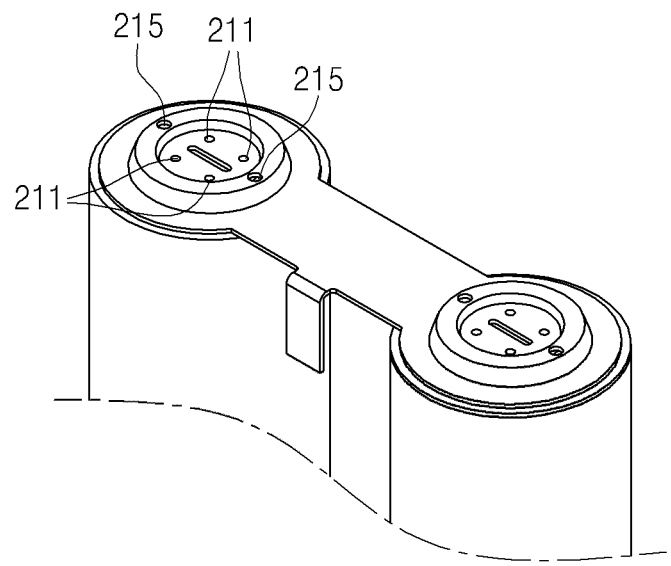
FIG. 10 is a perspective view of a battery module in accordance with the second exemplary embodiment.

FIG. 10 is a perspective view of a battery module in accordance with the second exemplary embodiment.

Referring to FIGS. 7 and 10, a battery module 200 in accordance with the second exemplary embodiment includes: battery cells 240, metal plates 210 having circular sections connected by a body, which contact and are electrically connected to respective electrode terminals of the battery cells 240 and which have respective spot welding sections in which a plurality of protrusions contacting the electrode terminals are formed; and heat conduction members 220 injected in inner spaces between the respective electrode terminals of the battery cells and the respective metal plates. Each battery cell 240 may include a cap 241_1, and a first side 241 and a second side 242 that correspond to electrode terminals of the battery cells 240

The metal plates 210 may be formed only on one-side surfaces of the battery cells or may also be formed on both-side surfaces of the battery cells.

A specific configuration of the battery module 100 will be described below in more detail.

Firstly, the metal plates 210 will be described in detail with reference to FIG. 8.

Figure 8:
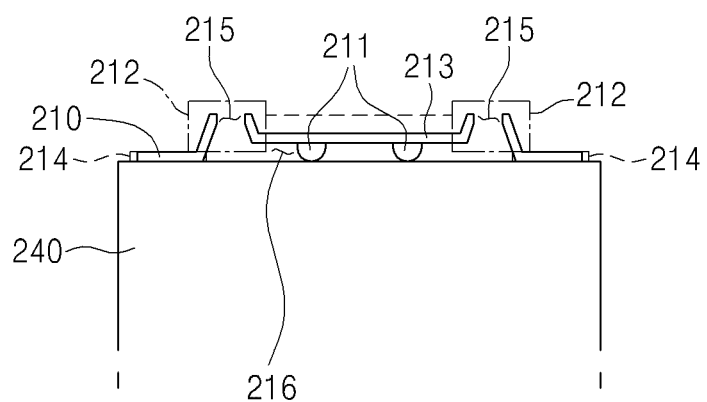
FIG. 8 is a side view of a metal plate and a battery cell in accordance with the second exemplary embodiment.

FIG. 8 is a side view of a metal plate and a battery cell in accordance with the second exemplary embodiment. Referring to FIG. 8, the metal plate 210 is a component which contacts and is electrically connected to the electrode terminals of the battery cells 240, and which has a spot welding section provided with a plurality of protrusions 211 contacting the electrode terminals for electrical connection.

The protrusions 211 are created by spot welding performed for electrical connection between the electrode terminals of the battery cells and the metal plate. In addition, the protrusions 211 may also be protruding portions on the reverse side of a guide groove which is formed at the same position over the protrusions 211 for convenience of spot welding.

In addition, the metal plate 210 is provided with: an elevated part 212 which is formed in a shape bent to the outside of a surface, on which the metal plate and the electrode terminal of each of the battery cells are coupled, and surrounds the electrode terminal; a welding base part 213 which extends from the inside of the elevated part in a flat shape and has ductility for being movable downward so as to contact and be welded to the electrode terminal of each of the battery cells; a plate contact part 214 which is formed in a shape bent and extending from an edge of the elevated part so as to contact an upper surface of the electrode terminal; and heat conductive member injection openings 215 created by perforating predetermined regions of an upper surface of the elevated part so as to inject the heat conductive member.

In addition, the metal plate 210 includes a heat conductive member arrangement part 216 which is a space formed inside the elevated part 212 and the welding base part 213 so that the heat conductive member 220 is disposed.

More specifically, the elevated part 212 is a component formed in a shape which is bent outside the surface, on which the metal plate and the electrode terminal of each of the battery cells are coupled, and surrounds the electrode terminal, and the elevated part 212 is formed in a height of approximately 1.5 to 3 times the thickness of the metal plate, and more favorably, in a height of approximately 1 to 2 times the thickness of the metal plate. When the height of the elevated part 212 is formed in a height of less than 1 times the thickness of the metal plate, since the heat conductive member is formed of an adhesive member, a problem may be caused in which the heat conductive member is not easily injected.

In addition, when the height of the elevated part 212 exceeds approximately 3 times the thickness of the metal plate, the amount of injected heat conductive member increases, and thus, a problem may be caused in which manufacturing costs increase or a heat conduction rate decreases due to generation of an air gap even when injecting a predetermined injection amount. Thus, the height of the elevated part 212 is formed in a proper height so that the heat conductive member 220 may be uniformly distributed in the heat conductive member arrangement part 216 and a proper amount may be injected, and the problem may be prevented in which the heat conductive member leaks to the outside of the heat conductive member arrangement part 216 during injection.

In addition, the welding base part 213 is a component which has a flat-shape spot welding section extending from the inside of the elevated part and has ductility for being movable downward so as to contact and be welded to the electrode terminal of each of the battery cells. Accordingly, the spot welding between the electrode cell of each of the battery cells and the metal plate is performed on the spot welding section of the metal plate, the spot welding section is melted to form the protrusions 211 on the lower surface of the spot welding section, and the metal plate is electrically connected to the battery cells via the protrusions 211.

The plate contact part 214 is a component formed in a shape bent and extending from the edge of the elevated part 212 and contacting the upper surface of the electrode terminal, and prevents the heat conduction member 220 disposed inside the heat conduction member arrangement part 216 from being discharged to the outside.

In addition, the heat conductive member injection openings 215, which are created by perforating predetermined regions of the elevated part so as to inject the heat conductive member 220, allow the heat conductive member 220 to be easily filled.

In addition, the heat conductive member arrangement part 216 is a space formed inside the elevated part 212 and the welding base part 213 so as to be filled by the injected heat conductive member 220, and when the heat conductive member 220 is injected, the space excluding the protrusions 211 is filled.

In addition, the heat conductive member 220 is a component disposed in the inner space between the electrode terminal of each of the battery cells 240 and the metal plate 210, and will be described in detail with reference to FIG. 9.

Figure 9:
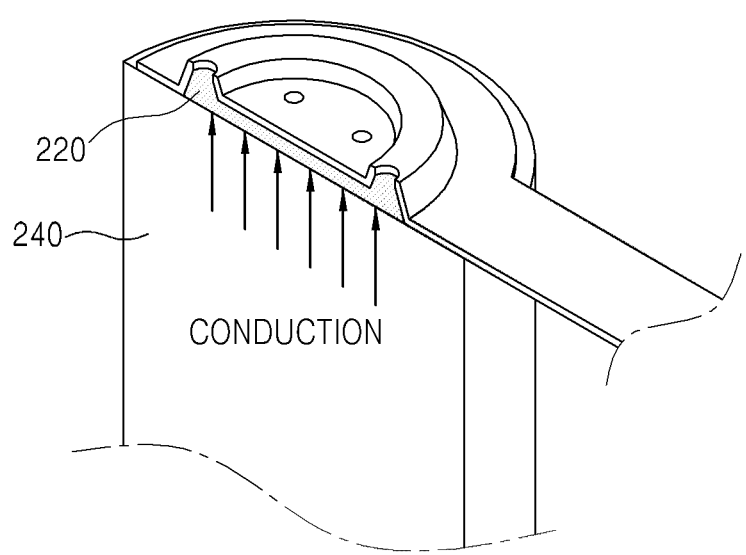
FIG. 9 is a cross-sectional perspective view of a battery module in which a heat conductive material is injected in accordance with the second exemplary embodiment.

FIG. 9 is a cross-sectional perspective view of a battery module in which a heat conductive material is injected in accordance with the second exemplary embodiment.

Referring to FIG. 9, the heat conductive member 220 is provided in the heat conductive member arrangement part 216 excluding the protrusions 211, and the heat conductive member 220 transfers heat generated in the battery cells to the metal plate 210 and allows heat, which was circulated by convection and not dissipated in an air gap according to related arts, to be quickly discharged to the outside.

For the heat conductive member 220, a liquid glue or a heat dissipation paste having high heat conductivity may be used. Such a liquid glue or a heat dissipation paste has adhesiveness and is prevented from leaking to the outside of the heat conductive member arrangement part 216 when injected. In addition, the heat conductive member has a characteristic of assuming an adhesive liquid phase shape before being injected into the heat conductive member arrangement part 216, but being cured when a predetermined time elapses after being injected.

In addition, the battery cells 240 are configured to be cylindrical cells as a single pair in which positive electrode terminals and the negative electrode terminals are alternately arranged, but may be arranged as a single pair in which the same electrodes are arranged in parallel.

In addition, since the battery module in accordance with the exemplary embodiment uses cylindrical battery cells, the welding base parts 213 and the plate contact parts 214 are formed in circular shapes.

In addition, the battery module having improved heating effect as the exemplary embodiment is used as power sources for various devices such as cleaners or electric tools, and is operated in a reduced heating state compared to that in related arts, thereby having enhanced stability.

Example 3

Next, a battery module in accordance with a third exemplary embodiment will be described.

A battery module in accordance with the third exemplary embodiment has battery cells formed in pouch cells or rectangular cells unlike the abovementioned exemplary embodiments, and a heat conduction member is filled in an air gap that degrades heat discharge efficiency of the battery cells formed by connecting the electrode terminals of the battery cells and a printed circuit board, and thus, the heat discharge efficiency can be enhanced.

In general, in a battery module using pouch-type or rectangular-type battery cells, a metal plate is bent several times for welding stability and connects the printed circuit board (PCB) and the battery cells. Protrusions formed by spot welding are formed in the metal plate and an air gap is formed in a free space by the protrusions. Since the air gap circulates heat generated in the battery cells by convention, the heat may not escape to the outside and stay inside the metal plate and thereby increase the heating of the battery module.

Accordingly, a battery module of a type, from which heat generated in the battery cells may be quickly conducted, will be described in detail with reference to FIG. 11.

Figure 11:
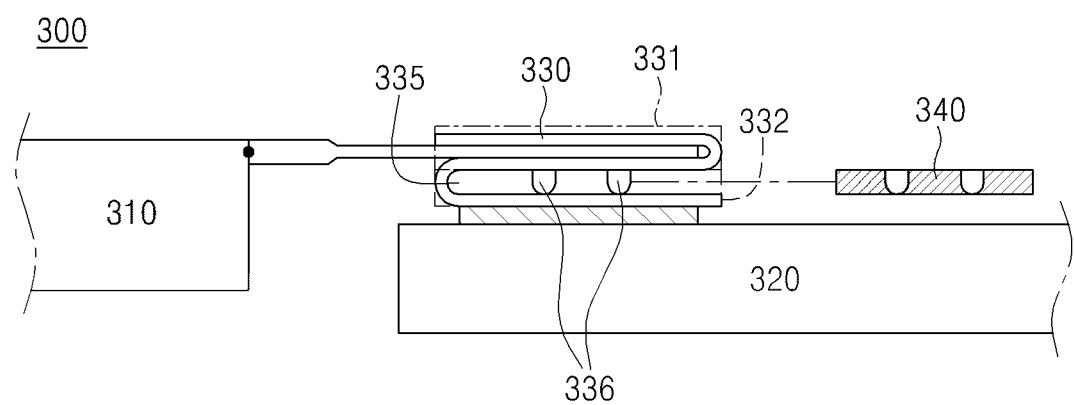
FIG. 11 is a cross-sectional side view of a battery module in accordance with a third exemplary embodiment.

FIG. 11 is a cross-sectional side view of a battery module in accordance with the third exemplary embodiment.

Referring to FIG. 11, a battery module 300 in accordance with the third exemplary embodiment includes: battery cells 310; a printed circuit board 320 provided with a circuit for controlling the battery cells 310; a metal plate 330 which includes a first bent part 331 formed to be bent so as to contact and be electrically connected to upper/lower surfaces of electrodes of the battery cells, and a second bent part 332 including a plurality of protrusions formed under the first bent part and formed to be bent so as to be electrically connected to the printed circuit board; and a heat conductive member 340 injected into an inner space of the second bent part 332 so as to fill the second bent part.

Each of such components constituting the battery module 300 will be described below in more detail.

The battery module 300 in accordance with the third exemplary embodiment uses pouch-type or rectangular-type battery cells, and the configuration connected to the metal plate 330 may not only be the printed circuit board 320 but also be any configuration for performing spot welding, for example, a busbar.

In addition, the printed circuit board 320 is provided with a circuit therein for controlling the battery cells and is joined to the metal plate 330 by soldering welding.

The joining between the printed circuit board 320 and the metal plate 330 is more preferentially performed than spot welding between the electrodes of the battery cells 310 and the metal plate 330, and the metal plate 330 is bent several times in order to prevent a decrease in joining force of the preferentially joined joint portion during the spot welding.

The metal plate 330 is provided with: the first bent part 331 which is the region bent to contact and be electrically connected to the upper/lower surfaces of the battery cells; and the second bent part 332 which is the region including the plurality of protrusions 336 formed under the first bent part and bent to be electrically connected to the printed circuit board.

The metal plate 330 will be described in detail with reference to FIGS. 12 and 13.

FIG. 12 is a structural view of a metal plate in accordance with the third exemplary embodiment.

(a) of FIG. 13 is a side view of a metal plate coupled to a battery cell in accordance with the third exemplary embodiment, and (b) of FIG. 13 is a front view of the metal plate coupled to the battery cell in accordance with the third exemplary embodiment.

Referring to FIGS. 12 and 13, the metal plate 330 is provided with an elevated part 333 which is formed to be bent to the outside of the surface opposite to the surface contacting the electrodes of the battery cells and forms a partition wall on a pair of surfaces contacting and facing each other in the second bent part 332; and a heat conductive member arrangement part 335 which is provided with a heat conductive member injection opening 334 in a predetermined region, in which the elevated part 333 is not formed, so that the heat conductive member is disposed, and which is a space for arranging the heat conductive member inside the elevated part 333.

More specifically, as illustrated in FIG. 12, the metal plate 330 is provided with the elevated part 333 having a flat box shape elevated in the upward direction. After the metal plate 330 is joined to the printed circuit board 320, the metal plate 330 is bent so as to contact the electrode terminals of the battery cells 310 in a shape surrounding the upper/lower surfaces of the electrode terminals.

At this point, the region formed by the contact of the metal plate 330 with the upper/lower surfaces of the electrode terminals of the battery cells 310 is referred to as the first bent part 331.

In addition, the uppermost end of the bent metal plate 330 is spot welded and protrusions 336 are formed on the metal plate 330. The region in which the protrusions 336 are formed is referred to as the second bent part 332, and the heat conductive member arrangement part 335 which is the space for arranging the heat conductive member is formed inside the second bent part 332.

In addition, in the metal plate 330, the partition wall is formed as illustrated in (a) of FIG. 13 so as to prevent the heat conductive member from being detached to the outside through the elevated part 333. In order to form such the partition wall, the second bent part 332 should firstly have the heat conductive member arrangement space formed in an inside height of approximately 1% to 20% of the thickness of the battery cell, and the elevated part 333 should be formed in a height of approximately 50% of the inside height of the second bent part.

In addition, the heat conductive member injection opening 334 is a configuration formed in a predetermined region, in which the elevated part is not formed, so that the heat conductive member 340 is disposed in the second bent part 332, and as illustrated in (b) of FIG. 13, since the partition wall is formed in only approximately 50% of the second bent part 332, the region corresponding to remaining approximately 50% is formed as the heat conductive member injection opening.

In addition, the heat conductive member 340 is a component disposed in the inner space of the second bent part so as to fill the inside of the second bent part, and is provided to the heat conductive member arrangement part 335 excluding the protrusions 336.

The heat conductive member 340 transfers heat generated in the battery cell to the uppermost end of the metal plate 330 and allows the heat, which was circulated by convection in an air gap and not dissipated in related arts, to be quickly discharged to the outside.

In addition, for the heat conductive member 340, a liquid glue or a heat dissipation paste having high heat conductivity may be used. Such a liquid glue or a heat dissipation paste has adhesiveness and may be uniformly distributed inside the heat conductive member arrangement part 335 so as not to leak to the outside of the heat conductive member arrangement part 335. In addition, the heat conductive member has a characteristic of assuming an adhesive liquid phase shape before injected into the heat conductive member arrangement part 335, but being cured when a predetermined time elapses after being injected. In addition, the heat conductive member 340 used in the third exemplary embodiment uses a material, having a greater viscosity than the materials used in the first and second exemplary embodiments, and prevents the heat conductive member 340 injected into the second bent part 332 from leaking to the outside.

In a battery module in accordance with exemplary embodiments, the heat conduction rate of an air gap is improved due to injection of a heat conductive member into the air gap formed between a metal plate and electrode terminals of battery cells, and thus, heat generated in the battery cells can be quickly discharged to the outside.

So far, the technical idea of the present invention has been specifically described with respect to the above embodiments, but it should be noted that the foregoing embodiments are provided only for illustration while not limiting the present disclosure. In addition, a person with an ordinary skill in the technical field belonging to the present invention may carry out various embodiments within the scope of claims set forth herein.

What is claimed is:

1. A battery module comprising:
    battery cells;
    a metal plate configured to contact and be electrically connected to electrode terminals of the battery cells, and comprising a spot welding section elevated away from the electrode terminals and provided with a plurality of protrusions contacting the respective electrode terminals;
    inner spaces located between the spot welding section and the respective electrode terminals of the battery cells; and
    a heat conductive member disposed in the inner spaces between the electrode terminals of the battery cells and the spot welding section of the metal plate.

2. The battery module of claim 1, wherein the metal plate is provided with:
    a welding base part provided with the spot welding section that is flat shaped, and having ductility for being movable downward so as to contact and be welded to the electrode terminals of the battery cells;
    a plate contact part formed in a shape bent and extending from an edge of the welding base part and contacting upper surfaces of the electrode terminals; and
    a heat conductive member injection opening perforated in a predetermined region of an upper surface of the welding base part so that the heat conductive member is injected therethrough,
    wherein the battery module is configured to comprise a heat conductive member arrangement part having a space formed inside the welding base part so as to be filled by the injected heat conductive member.

3. The battery module of claim 2, wherein the heat conductive member includes a liquid glue or a heat dissipation paste and is cured after being injected into the heat conductive member arrangement part.

4. The battery module of claim 1, wherein the metal plate is joined to the electrode terminals of the battery cells by spot welding.

5. The battery module of claim 1, wherein the battery cells are provided in a single pair in which positive electrode terminals and negative electrode terminals are alternately arranged.

6. A device using the battery module of claim 1 as a power source.

7. The battery module of claim 1, wherein the plurality of protrusions penetrate the heat conductive member.

8. A battery module comprising:
    battery cells;
    a metal plate having circular sections connected by a body, and configured to contact and be electrically connected to electrode terminals of the battery cells, and comprising a spot welding section elevated away from the electrode terminals and provided with a plurality of protrusions contacting the electrode terminals;
    inner spaces located between the spot welding section and the respective electrode terminals of the battery cells; and
    a heat conductive member disposed in the inner spaces between the electrode terminals of the battery cells and the spot welding section of the metal plate.

9. The battery module of claim 8, wherein the metal plate is provided with:
    an elevated part formed in a shape bent to an outside of a surface on which the metal plate and the electrode terminals of the battery cells are coupled;
    a welding base part provided with the spot welding section of a flat-shape and having ductility for being movable downward so as to contact and be welded to the electrode terminals of the battery cells;
    a plate contact part formed in a shape bent and extending from an edge of the elevated part and contacting an upper surface of each of the electrode terminals; and
    a heat conductive member injection opening perforated in a predetermined region of an upper end of the elevated part so that the heat conductive member is injected therethrough,
    wherein the battery module is configured to comprise a heat conductive member arrangement part having a space formed inside the elevated part and the welding base part so as to be filled by the injected heat conductive member.

10. The battery module of claim 9, wherein the elevated part has a height of 1.5 to 3 times a thickness of the metal plate.

11. The battery module of claim 10, wherein the height of the elevated part is 1 to 2 the thickness of the metal plate.

12. The battery module of claim 9, wherein the heat conductive members includes a liquid glue or a heat dissipation paste and is cured after being injected into the heat conductive member arrangement part.

13. The battery module of claim 8, wherein the metal plate is joined to the electrode terminals of the battery cells by spot welding.

14. The battery module of claim 8, wherein the battery cells are provided in a single pair in which positive electrode terminals and negative electrode terminals are alternately arranged.

15. A device using the battery module of claim 8 as a power source.

* * * * *